M. J. Roberts,
Lubricating Spindles.

Nº 42,308.          Patented Apr. 12, 1864.

Witnesses.          Inventor.

UNITED STATES PATENT OFFICE.

MARTYN JOHN ROBERTS, OF PENDARREN HOUSE, WALES.

IMPROVEMENT IN DEVICES FOR LUBRICATING SPINDLES, &c., IN SPINNING AND OTHER MACHINES.

Specification forming part of Letters Patent No. 42,308, dated April 12, 1864.

*To all whom it may concern:*

Be it known that I, MARTYN JOHN ROBERTS, of Pendarren House, near Crickhowell, in the county of Brecon, Wales, have invented Improved Means or Apparatus for Oiling or Lubricating Spindles and other Parts of Machinery; and I do hereby declare that the following is a full and exact description thereof, reference being had to the accompanying drawings, and to the figures and letters marked thereon.

My invention consists in effecting the better lubrication of spindles and other parts of machinery than heretofore, and at the same time in preventing waste of the lubricating matters, as hereinafter described. I cause one end of the bearing, which in vertical or inclined bearings is the lower end, to dip into a cup containing oil or other lubricant, which cup is in some cases stationary and in others it revolves, and at the opposite end, which in vertical or inclined bearings is the upper end, I use another cup or reservoir, into which any oil or lubricant that would otherwise be wasted is caught and can be returned to the bearing. I usually cover the oil-cups with a plate having a hole in the center, through which the spindle or other revolving part of machinery passes. And I sometimes use a partition within the cup to prevent the lubricant escaping through the cover of the cup; and I also sometimes use a plate fixed to the spindle or other part revolving within the cup or reservoir, which I call a "flash-plate," the use of which is to flash or throw into the reservoir the oil or other lubricant which might otherwise creep up and escape. In cases where the collar or bearing-rail of the spindle or other part of machinery traverses up and down I fix to the collar or bearing a tube which embraces the spindle, but which may or may not touch it. This tube dips into another tube of corresponding length, attached to the reservoir for oil or other lubricant, thus preventing any waste of the lubricant by leakage from the bottom of the bearing or the exposed part of the spindle.

Figure 1:
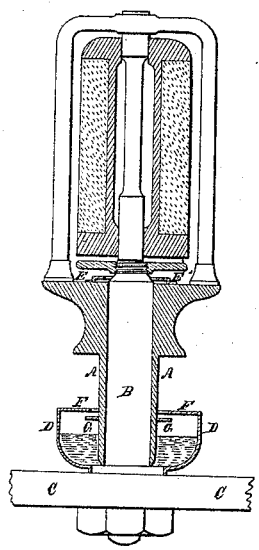

In the drawings, Figure 1 is a vertical section showing my means or apparatus for oiling or lubricating applied to a flier with a socket, A, formed in a piece with it, running upon a pin or stud, B, screwed to a rail, C, as described in the description of my improvements in means or apparatus for preparing and spinning and doubling or twisting, for which I have applied for Letters Patent in the United States of even date herewith.

Upon the pin B, I fit a cup, D, for containing the oil or other lubricant. When the flier revolves, capillary attraction and the screwing motion of the socket A upon the pin B draw the oil up between the socket and the pin to the top of the socket, where it is received or caught by another cup, E, and is thus prevented from being thrown out and wasted by the centrifugal force of the revolving flier and socket. When the flier is stopped to doff the bobbin, or for other purpose, the oil in the cup E runs back between the socket and the pin into the cup D. When the flier is again revolved, the oil again rises into the cup E, and so on continuously. I prefer to cover the oil-cups with a plate, F, with a hole in the center through which the pin B passes, as shown; and in some cases I use a flash-plate, G, fixed to the socket A, to prevent waste from the oil creeping up the outside of the socket.

Figure 2:
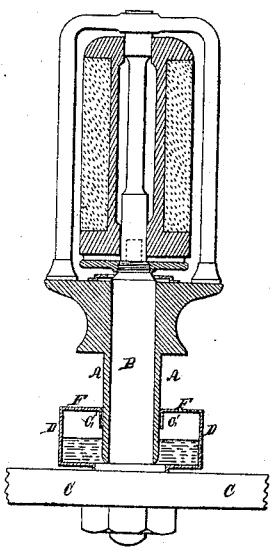

In addition to the cover of the cups, as before described, I sometimes use a division or tube, which, projecting from near the center part of the cover downward, as at G', Fig. 2, effectively prevents the oil from escaping at the central aperture.

Figure 3:
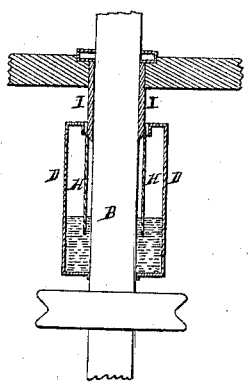

When the collar or bearing slides up and down the spindle, as in some cotton-spinning frames and roving frames, I then elongate the bearing by means of a tube, H, Fig. 3, which surrounds the spindle and may or may not touch it. The cup D is elongated in a similar manner to receive the elongated bearing H, and when the collar I descends or ascends the elongated portion is within the cup and escape of oil is prevented.

Figure 4:
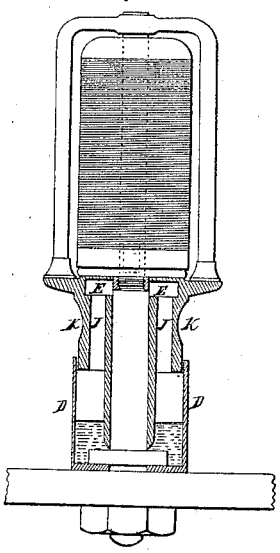

In order that the oil may return faster into the cup D, I sometimes form one or more holes, J J, through the whirl K, as represented in Fig. 4, leading from the cup E to the cup D. I also sometimes form the upper cup or reservoir, E, by forming a recess in the top of the whirl itself, as shown in the same figure.

Figure 5:
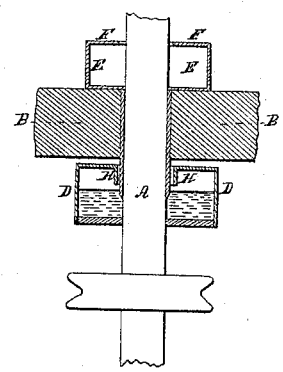

To adapt my means or apparatus for oiling or lubricating to old-fashioned spindles the cup D is fastened to the spindle and revolves with it, while the collar or other bearing, being fixed, dips into the cup. This arrangement is represented in Fig. 5.

A is the spindle, B the fixed collar-rail, C the collar in which the spindle runs, having a cup, E, to catch the oil worked up by the revolving spindle. F is a cover to this cup, which may, however, be dispensed with. D is the lower oil cup fastened to the spindle by a leather washer to slide down for cleaning the cup and getting the spindle into its place. G is the cover of this cup. H is an internal tube to prevent waste of oil by the revolution of the spindle.

In all the cases the oil is drawn up between the bearing and revolving part, and if drawn up too vigorously the excess is caught by the cup at the top of the bearing and is or may be returned by the space between the collar and bearing when the machinery is at rest or through holes made through the collar or rail, or in any other desirable manner.

Having now fully described my said invention and the manner in which it is or may be carried into effect, I claim the means of preventing the escape of the oil or other lubricant in the lubrication of vertical and inclined spindles and other vertical and inclined parts of machinery by—

1. An upper chamber or cup to receive the oil or other lubricant, made to rise from a lower oil cup or vessel by the revolution of the parts to be lubricated, substantially as hereinbefore described.

2. A tube or tubular projection on or fixed to the cover of the cup containing the oil or other lubricant, substantially as hereinbefore described.

3. Revolving cups fitted with a cover to prevent oil or other lubricant matter being thrown out, substantially as hereinbefore described.

4. What I term a "flash-plate," substantially as hereinbefore described.

5. The apparatus applicable to sliding collars, as shown at Fig. 3, and hereinbefore described.

MARTYN J. ROBERTS.

Witnesses:
  MORGAN PROTHEROE,
  EDWARD BEAVIS,
*Clerks to Messrs. G. A. A. Davies & Son, Solrs., Crickhowell.*